United States Patent
Kozak

(10) Patent No.: US 8,235,636 B2
(45) Date of Patent: Aug. 7, 2012

(54) SPRING-LOADED KINEMATIC ADJUSTMENT SCREW

(76) Inventor: Eugeniusz Kozak, Mount Olive, NJ (US)

( * ) Notice: Subject to any disclaimer, the term of this patent is extended or adjusted under 35 U.S.C. 154(b) by 929 days.

(21) Appl. No.: 12/292,573

(22) Filed: Nov. 21, 2008

(65) Prior Publication Data

US 2010/0131015 A1    May 27, 2010

(51) Int. Cl.
*F16B 35/00*    (2006.01)
(52) U.S. Cl. ..... 411/393; 411/380; 411/383; 411/941.2; 411/941.3
(58) Field of Classification Search ............... 411/380, 411/382, 383, 393, 394, 941.2, 941.3; 606/309, 606/313; 359/694
See application file for complete search history.

(56) References Cited

U.S. PATENT DOCUMENTS

| | | | | |
|---|---|---|---|---|
| 935,061 | A * | 9/1909 | Roulstone | 301/111.03 |
| 936,549 | A * | 10/1909 | Lundholm | 411/393 |
| 1,523,932 | A * | 1/1925 | Davies | 411/393 |
| 2,433,817 | A * | 12/1947 | Rochester | 333/125 |
| 2,819,486 | A * | 1/1958 | Dick | 16/24 |
| 4,088,396 | A | 5/1978 | Edelstein | |
| 5,140,470 | A | 8/1992 | Luecke | |
| 5,267,089 | A | 11/1993 | Yamamoto | |
| 5,530,547 | A | 6/1996 | Arnold | |
| 5,694,257 | A | 12/1997 | Arnone et al. | |
| 5,953,164 | A | 9/1999 | Arnone et al. | |

FOREIGN PATENT DOCUMENTS

| | | |
|---|---|---|
| WO | WO 90/10787 | 9/1990 |
| WO | WO 2006/055399 | 5/2006 |

* cited by examiner

*Primary Examiner* — Victor Batson
*Assistant Examiner* — Roberta Delisle
(74) *Attorney, Agent, or Firm* — Thomas J. Germinario

(57) ABSTRACT

A precision kinematic adjustment screw for optical mounts controls the position of the stage plate relative to the base plate so that the position is stable, consistent and reproducible. Use of a spring-loaded spherical member that is free to rotate independent of the screw minimizes friction between the proximal end of the screw and the contact surface of the stage plate and reduces the potential for deformation and/or abrasion of the contact surface.

5 Claims, 2 Drawing Sheets

SPRING-LOADED KINEMATIC ADJUSTMENT SCREW

BACKGROUND OF THE INVENTION

The present invention relates to precision screws used to make ultra-fine adjustments to the positions and/or angular orientations of optical components.

Adjustable mounting apparatuses are commonly used in applications, such as interferometry and holography, in which precise positioning of optical components is essential. Such optical mounts typically comprise a pair of parallel plates: a base plate, which is rigidly fixed to a supporting base or surface, and a stage plate, on which optical components, such as mirrors, lenses, diffraction gratings, prisms, beam-splitters, light sources, and lasers, are mounted. Typically, the stage plate is coupled to the base plate by one or more compressive means—usually springs—which urge the two plates together. Countering the tensioning force of the springs are multiple kinematic adjustment members, which are typically ultra-fine pitch screws that control the position of the stage plate relative to the base plate.

In conventional optical mounts, there are six points of contact between the adjustment screws and the stage plate so as to fix the six degrees of freedom of movement—three translational and three rotational—between the two plates. The contact end of the adjustment screw often has a hemispherical shape, hence such screws are often referred to as "ball-tipped". The areas on the stage plate where the adjustment screws make contact are typically detents having a concave hemispherical, conical, or multi-planar configuration. For high-precision optical applications, it is essential that the contact between the adjustment screw and the detents be kinematic, low friction, stable, consistent, and reproducible.

A major impediment to a stable and consistent contact between the ball of the adjustment screw and the stage plate detent is the potential for deformation of the detent contact surfaces under the stress of the ball-tip applied against the resistance of the springs. The potential for deformation of the contact surfaces is exacerbated by the fact that the hemispherical tip of the adjustment screw must rotate within the detent as the screw turns, thus applying radial as well as axial stresses on the contact surfaces.

The prior art in this field has approached this problem by seeking to optimize the contact surfaces of the stage plate. In this vein, the U.S. Pat. No. 5,953,164 of Arnone et al., and the published PCT application of Arnone, 2006/055399, teach the use of three kinematic adjustment screws in conjunction with three different types of contact surfaces. The three contact surfaces provide one, two and three degrees of constraint, respectively, which cooperate to provide the requisite six degrees of constraint. While these designs do tend to reduce axial stress by minimizing the points of contact between the ball-tip of the adjustment screw and the detent surface of the stage plate, the ball-tip will still rotate within the contact detent as the screw turns, thus potentially deforming and/or abrading the contact surfaces over time.

Another approach to the problem taught by the prior art involves interposing a bearing or ball between the threaded end of each of the adjustment screws and the cooperating contact surface. Such a design is disclosed in U.S. Pat. No. 5,694,257 of Arnone et al. Here again, however, the rotational torque of the adjustment screws is applied directly to the ball members, causing them to rotate against the contact surfaces. In order to reduce the potential for deformation/abrasion of the contact surface, the Arnone patent employs sapphire pads inserted into the contact detents. But the use of such sapphire pads has several disadvantages. There is the obvious expense associated with the use of sapphire material. Also, the sapphire pads allow only one point of contact between each of the adjustment screws and the stage plate, thereby providing only one degree of constraint per screw and requiring additional means beyond the three adjustment screws to achieve the requisite six degrees of constraint.

The present invention represents a significant advance over the prior art insofar as it integrates an unconstrained spherical member within a cavity in the proximal end of the kinematic adjustment screw itself. The contact between the spherical member and the distal end of the cavity is spring-loaded, such that the spherical member is not rotationally coupled to the adjustment screw. Consequently, the spherical member will not rotate against the contact surface of the stage plate as the adjustment screw is turned, thereby eliminating the potential for deformation and/or abrasion of the contact surfaces without the need for special protective features in the contact surfaces themselves.

SUMMARY OF THE INVENTION

The present invention is a precision kinematic adjustment screw for optical mounts that controls the position of the stage plate relative to the base plate so that the position is stable, consistent and reproducible. The present invention minimizes friction between the proximal end of the screw and the contact surface of the stage plate, as well as the potential for deformation and/or abrasion of the contact surface. All of this is achieved by a simple screw configuration that is inexpensive to fabricate and can be used in virtually any optical mount without the need for specially configured contact surfaces.

The present invention is a screw comprising an externally threaded cylinder having a medial axis, a proximal end and a distal end. The distal end can have a knob, a slot or other means by which a torque can be applied to it in order to turn the screw. The proximal end comprises a cavity, a spherical member, a spring, and a spring recess. The cavity is a cylindrical cut-out in the proximal end of the screw, and it comprises an open end, a closed end, and a radial wall.

The diameter of the cavity is slightly larger than that of the spherical member, such that the spherical member is free to rotate inside the cavity. At the open end of the cavity is a flange that extends around the entire circumference of the cavity. The flange forms a circular flange aperture having a diameter slightly less than that of the spherical member, such that the spherical member is axially confined within the cavity, while a hemispherical or semispherical section of the spherical member protrudes beyond the open end of the cavity.

Aligned with the medial axis of the screw in the closed end of the cavity is the spring recess, within which the spring is located. The spring recess comprises an exposed side and an enclosed side. The enclosed side terminates in a recess wall. The distal end of the spring engages the recess wall, while the proximal end of the spring extends beyond the exposed side of the spring recess and engages the spherical member, such that the tension of the spring urges the spherical member toward the open end of the cavity and prevents it from engaging the closed end of the cavity.

In operation, the screw threads through a base plate of an optical mount and the spherical member engages a contact surface of a stage plate of the optical mount. As the screw is turned, the countervailing tensions of the spring and a compressive means of the optical mount holds the spherical member immobile, such that one or more (depending on the configuration of the contact surface) stable contact points are established between the proximal end of the screw and the contact surface of the stage plate. Since the spherical member does not rotate in relation to the contact surface, friction between the proximal end of the screw and the contact surface is virtually eliminated, as is the potential for deformation and/or abrasion of the contact surfaces which would cause inconsistent and non-reproducible positioning the stage plate.

DETAILED DESCRIPTION OF THE PREFERRED EMBODIMENT

Figure 1:
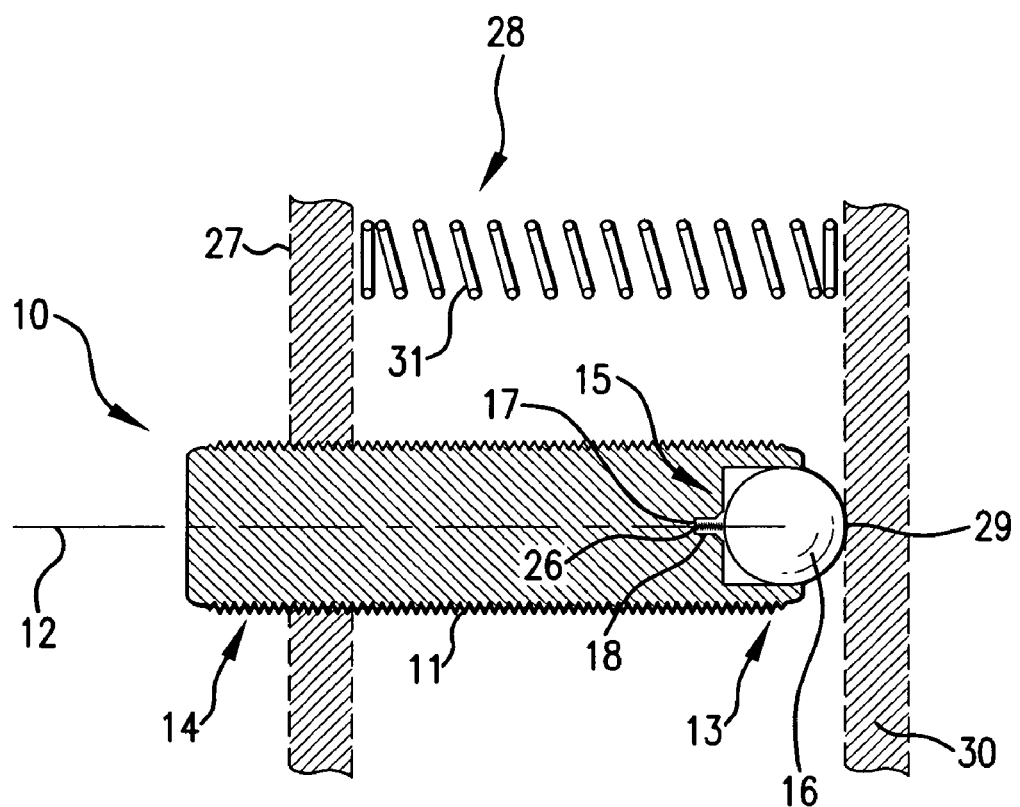
FIG. 1 is a cross-sectional cutaway view of the preferred embodiment of the present invention, with ghosted depiction of environmental features.
Figure 2:
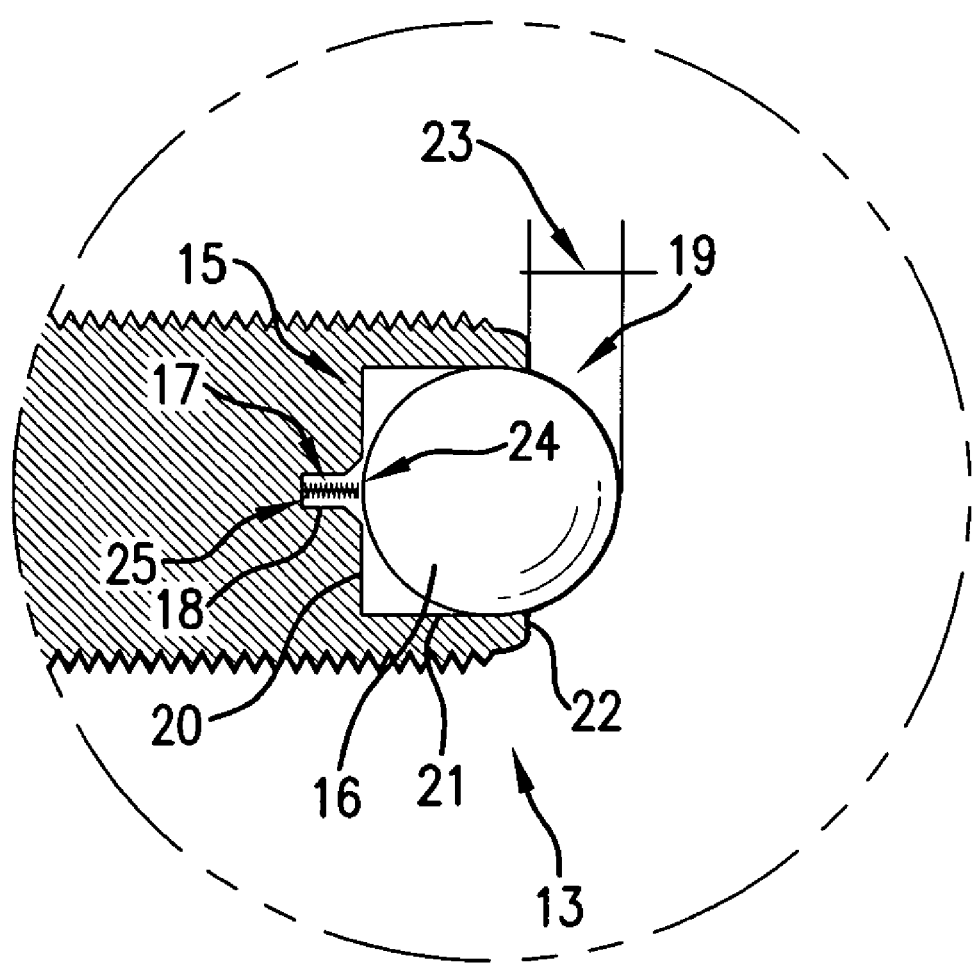
FIG. 2 is a cross-sectional cutaway detail views of the proximal end of the preferred embodiment of the present invention.

The present invention is a screw 10 comprising an externally threaded cylinder 11 having a medial axis 12, a proximal end 13 and a distal end 14. The distal end 14 can have a knob, a slot or other means (not shown) by which a torque can be applied to it in order to turn the screw 10. The proximal end 13 comprises a cavity 15, a spherical member 16, a spring 17, and a spring recess 18. The cavity 15 is a cylindrical cut-out in the proximal end 13 of the screw 10, and it comprises an open end 19, a closed end 20, and a radial wall 21.

The diameter of the cavity 15 is slightly larger than that of the spherical member 16, such that the spherical member 16 is free to rotate inside the cavity 15. At the open end 19 of the cavity 15 is a flange 22 that extends around the entire circumference of the cavity 15. The flange 22 forms a circular aperture having a diameter slightly less than that of the spherical member 16, such that the spherical member 16 is axially confined within the cavity 15, while a semispherical section 23 of the spherical member 16 protrudes beyond the open end 19 of the cavity 15.

Aligned with the medial axis 12 of the screw 10 in the closed end 20 of the cavity 15 is the spring recess 18, within which the spring 17 is located. The spring recess 18 comprises an exposed side 24 and an enclosed side 25. The enclosed side 25 terminates in a recess wall 26. The distal end of the spring 17 engages the recess wall 26, while the proximal end 13 of the spring extends beyond the exposed side 24 of the spring recess 18 and engages the spherical member 16, such that the tension of the spring 17 urges the spherical member 16 toward the open end 19 of the cavity 15 and prevents it from engaging the closed end 20 of the cavity 15.

In the preferred embodiment, the exposed side 24 of the spring recess 18 has a larger diameter than the enclosed side 25. The exposed side 24 preferably has a frustum shape, while the enclosed side 25 preferably has a cylindrical shape. Preferably, the exposed side 25 forms a 135-degree angle with the closed end 20 of the cavity 15.

In operation, the screw 10 threads through a base plate 27 of an optical mount 28 and the spherical member 16 engages a contact surface 29 of a stage plate 30 of the optical mount 28. As the screw 10 is turned, the countervailing tensions of the spring 17 and a compressive means 31 of the optical mount 28 holds the spherical member 16 immobile, such that one or more (depending on the configuration of the contact surface 29) stable contact points are established between the proximal end 13 of the screw 10 and the contact surface 29 of the stage plate 30. Since the spherical member 16 does not rotate in relation to the contact surface 29, friction between the proximal end 13 of the screw 10 and the contact surface 29 is virtually eliminated, as is the potential for deformation and/or abrasion of the contact surface 29 which would cause inconsistent and non-reproducible positioning the stage plate 30.

While this invention has been described with reference to a specific embodiment, the description is not to be construed in a limiting sense. Various modifications of the disclosed embodiment, as well other embodiments of the invention, will be apparent to persons skilled in the art upon reference to this description. It is therefore contemplated that the appended claims will cover any such modifications or embodiments that fall within the true scope of this invention.

What is claimed is:

1. A precision kinematic adjustment screw comprising:
    an externally threaded cylindrical screw having a medial axis, a proximal end and a distal end, wherein the distal end has a torque-applying means that is used to turn the screw, and wherein the proximal end comprises a cavity, a spherical member, a spring, and a spring recess; and
    wherein the cavity is a cylindrical cut-out in the proximal end of the screw, and the cavity comprises an open end, a closed end, and a radial wall, and the diameter of the cavity is slightly larger than that of the spherical member, such that the spherical member is free to rotate inside the cavity, and wherein at the open end of the cavity a flange extends around the entire circumference of the cavity and forms a circular flange aperture having a diameter slightly less than that of the spherical member, such that the spherical member is axially confined within the cavity, while a semispherical section of the spherical member protrudes beyond the open end of the cavity; and
    wherein the spring is located within the spring recess, which is aligned with the medial axis of the screw in the closed end of the cavity, and wherein the spring recess comprises an exposed side and an enclosed side, which terminates in a recess wall, and wherein the distal end of the spring engages the recess wall, while the proximal end of the spring extends beyond the exposed side of the spring recess and engages the spherical member, such that the tension of the spring urges the spherical member toward the open end of the cavity and prevents it from engaging the closed end of the cavity.

2. The precision kinematic adjustment screw according to claim 1, wherein the exposed side of the spring recess has a larger diameter than the enclosed side.

3. The precision kinematic adjustment screw according to claim 2, wherein the exposed side of the spring recess has a frustum shape, while the enclosed side has a cylindrical shape.

4. The precision kinematic adjustment screw according to claim 3, wherein the frustum-shaped exposed side of the spring recess forms a 135-degree angle with the closed end of the cavity.

5. A method of using a precision kinematic adjustment screw to control the position of a stage plate relative to a base plate of an optical mount, comprising:
    (a) providing a precision kinematic adjustment screw comprising: an externally threaded cylindrical screw having a medial axis, a proximal end and a distal end, wherein the distal end has a torque-applying means that is used to turn the screw, and wherein the proximal end comprises a cavity, a spherical member, a spring, and a spring recess; and wherein the cavity is a cylindrical cut-out in the proximal end of the screw, and the cavity comprises an open end, a closed end, and a radial wall, and the diameter of the cavity is slightly larger than that of the spherical member, such that the spherical member is free to rotate inside the cavity, and wherein at the open end of the cavity a flange extends around the entire circumference of the cavity and forms a circular flange aperture having a diameter slightly less than that of the spherical member, such that the spherical member is axially confined within the cavity, while a semispherical section of the spherical member protrudes beyond the open end of the cavity; and wherein the spring is located within the spring recess, which is aligned with the medial axis of the screw in the closed end of the cavity, and wherein the spring recess comprises an exposed side and an enclosed side, which terminates in a recess wall, and wherein the distal end of the spring engages the recess wall, while the proximal end of the spring extends beyond the exposed side of the spring recess and engages the spherical member, such that the tension of the spring urges the spherical member toward the open end of the cavity and prevents it from engaging the closed end of the cavity; and (b) threading the screw through the base plate of the optical mount, such that the spherical member engages a contact surface of the stage plate of the optical mount, and as the screw is turned, the countervailing tensions of the spring and a compressive means of the optical mount holds the spherical member immobile, such that the spherical member does not rotate in relation to the contact surface, and such that one or more stable contact points are established between the proximal end of the screw and the contact surface of the stage plate.

* * * * *